United States Patent
Powers et al.

(10) Patent No.: US 11,790,251 B1
(45) Date of Patent: Oct. 17, 2023

(54) SYSTEMS AND METHODS FOR SEMANTICALLY DETECTING SYNTHETIC DRIVEN CONVERSATIONS IN ELECTRONIC MEDIA MESSAGES

(71) Applicant: ARCHITECTURE TECHNOLOGY CORPORATION, Eden Prairie, MN (US)

(72) Inventors: Judson Powers, Ithaca, NY (US); Paul Nicotera, Ithaca, NY (US); Colleen Kimball, Ithaca, NY (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 682 days.

(21) Appl. No.: 16/661,074

(22) Filed: Oct. 23, 2019

(51) Int. Cl.
G06N 5/04 (2023.01)
G06F 16/23 (2019.01)
G06N 20/00 (2019.01)
G06F 40/30 (2020.01)
G06F 40/279 (2020.01)

(52) U.S. Cl.
CPC .......... G06N 5/04 (2013.01); G06F 16/2379 (2019.01); G06F 40/279 (2020.01); G06F 40/30 (2020.01); G06N 20/00 (2019.01)

(58) Field of Classification Search
CPC ...... G06N 5/04; G06N 20/00; G06F 16/2379; G06F 40/279; G06F 40/30
USPC .......................................................... 706/14
See application file for complete search history.

(56) References Cited

U.S. PATENT DOCUMENTS

| | | | |
|---|---|---|---|
| 9,760,838 B1* | 9/2017 | Danson | G06F 40/279 |
| 9,794,278 B1* | 10/2017 | Leita | G06N 7/01 |
| 10,162,850 B1* | 12/2018 | Jain | G06N 20/00 |
| 2012/0296845 A1* | 11/2012 | Andrews | G06Q 40/06 705/36 R |
| 2013/0290333 A1* | 10/2013 | Fraczak | H04L 43/04 707/E17.046 |
| 2014/0156673 A1* | 6/2014 | Mehta | H04L 67/025 709/224 |
| 2015/0081725 A1* | 3/2015 | Ogawa | H04L 12/1813 707/754 |
| 2015/0163311 A1* | 6/2015 | Heath | H04L 67/22 709/204 |
| 2015/0317564 A1* | 11/2015 | Chen | G06N 5/02 706/46 |
| 2016/0283562 A1* | 9/2016 | Alex | G06N 20/00 |
| 2017/0206470 A1* | 7/2017 | Marculescu | G06N 7/005 |
| 2017/0270425 A1* | 9/2017 | Danson | G06F 40/279 |
| 2017/0330078 A1* | 11/2017 | Koduru | G06N 3/126 |
| 2017/0331909 A1* | 11/2017 | Iadonisi | H04L 67/22 |
| 2018/0217981 A1* | 8/2018 | Rakshit | H04L 51/32 |
| 2018/0270260 A1* | 9/2018 | Govardhan | G06N 20/00 |
| 2019/0012746 A1* | 1/2019 | Sullivan | G06Q 30/02 |

(Continued)

Primary Examiner — Andrew R Dyer
(74) Attorney, Agent, or Firm — FOLEY & LARDNER LLP

(57) ABSTRACT

Various embodiments described herein relate to a machine-learning based electronic media analysis software system. The system is configured to detect anomalous and predictive patterns associated with an event. The system is configured to use feature extraction techniques and semi-supervised machine-learning to detect the patterns associated with the event in the electronic media messages, which may indicate a synthetic driven behavior and conversation corresponding to the event.

20 Claims, 3 Drawing Sheets

(56) References Cited

U.S. PATENT DOCUMENTS

| | | | |
|---|---|---|---|
| 2019/0173902 A1* | 6/2019 | Takahashi | H04L 63/1425 |
| 2020/0042858 A1* | 2/2020 | Fritsch | G06N 3/006 |
| 2020/0059375 A1* | 2/2020 | Hewitt | H04L 12/1822 |
| 2020/0126174 A1* | 4/2020 | Halse | G06F 40/253 |
| 2020/0134398 A1* | 4/2020 | Kruk | G06K 9/6292 |
| 2020/0210864 A1* | 7/2020 | Xiao | G06N 5/04 |
| 2020/0250268 A1* | 8/2020 | Travis | G06F 40/151 |
| 2020/0287936 A1* | 9/2020 | Nguyen | H04L 51/212 |
| 2020/0356925 A1* | 11/2020 | Papadimitriou | H04L 67/22 |
| 2020/0380405 A1* | 12/2020 | Trim | G06N 3/0427 |
| 2021/0042796 A1* | 2/2021 | Khoury | G06Q 30/0205 |
| 2021/0042830 A1* | 2/2021 | Burke | G06Q 30/02 |
| 2021/0103703 A1* | 4/2021 | Galitsky | G06N 5/04 |
| 2021/0168161 A1* | 6/2021 | Dunn | G06N 20/00 |

* cited by examiner

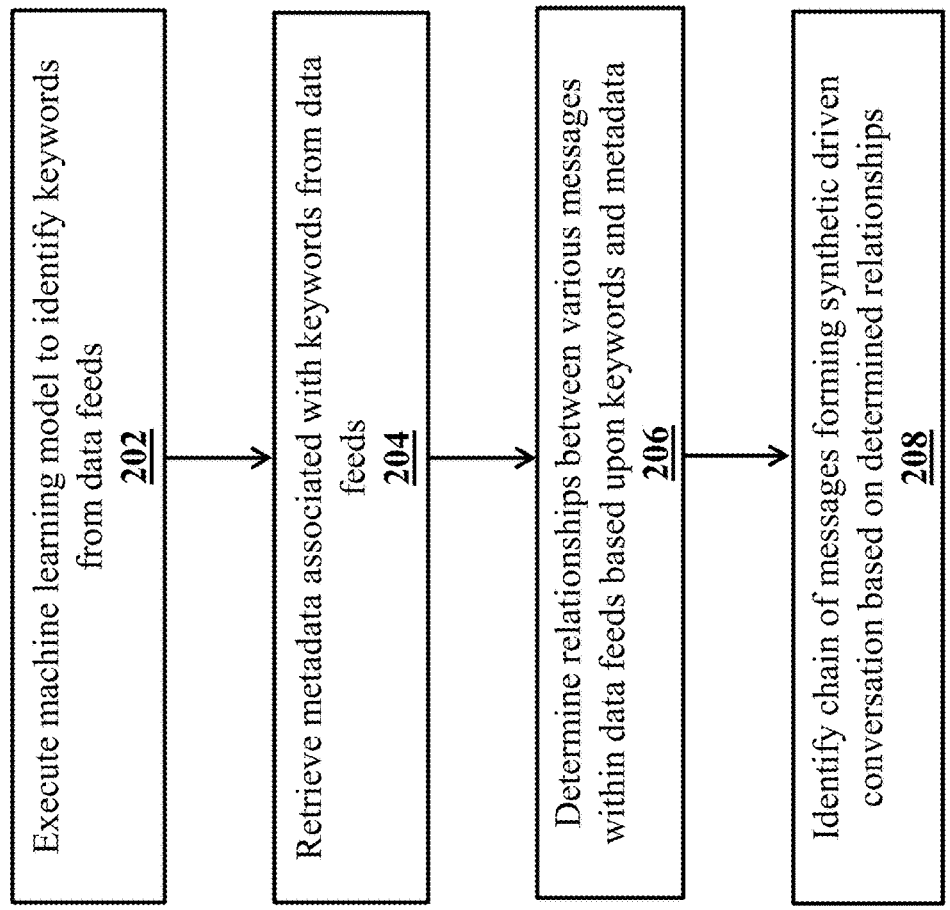

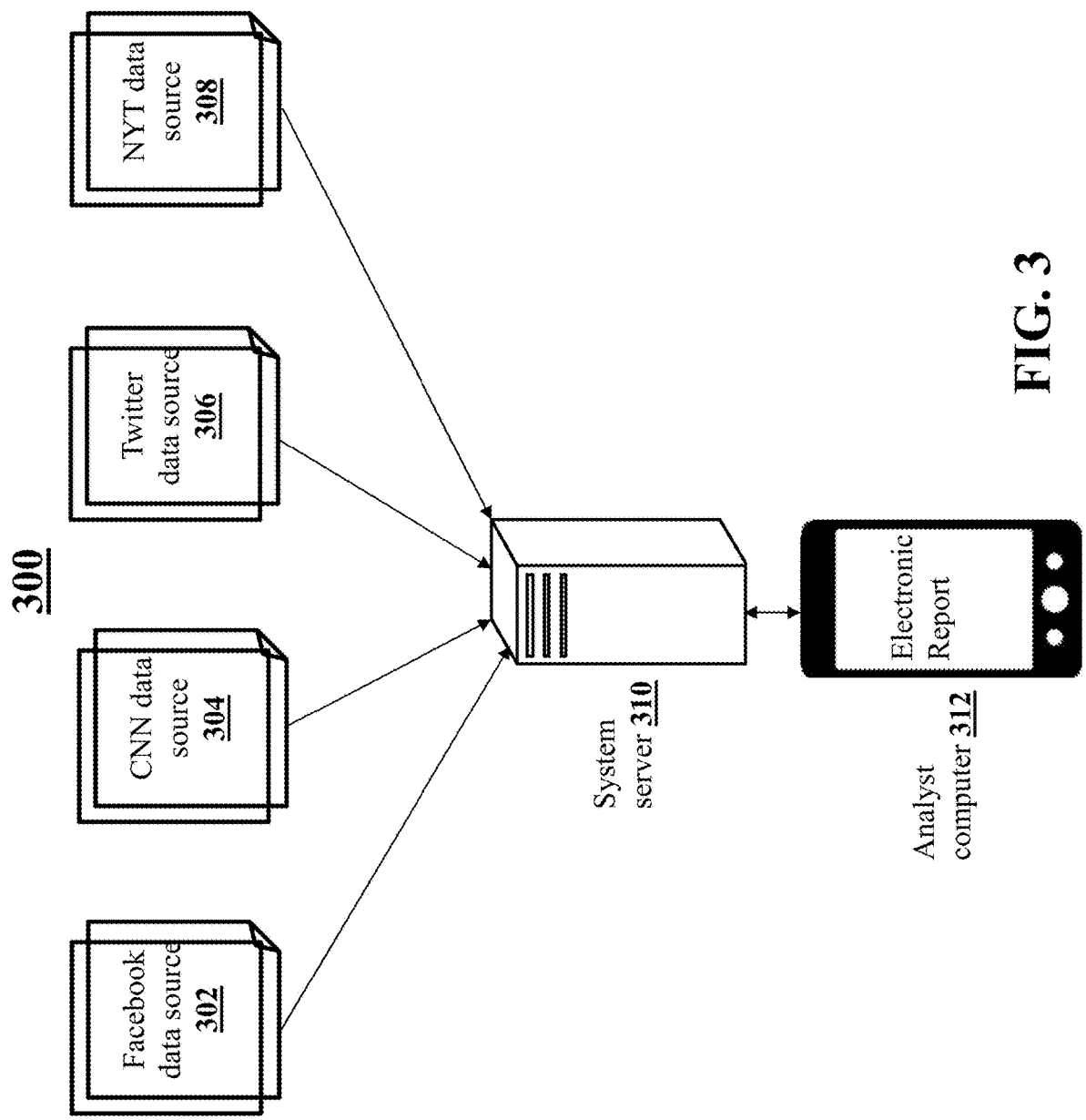

SYSTEMS AND METHODS FOR SEMANTICALLY DETECTING SYNTHETIC DRIVEN CONVERSATIONS IN ELECTRONIC MEDIA MESSAGES

TECHNICAL FIELD

This application relates to semantically detecting synthetic driven conversations in electronic media messages originating from a plurality of sources.

BACKGROUND

There has been an explosive growth of electronic media platforms across the spectrum of centralized digital broadcasting (e.g., a news website) and decentralized social media posts. Compared to conventional over the air broadcasting containing scheduled and structured programs, digital broadcasting rapidly presents and updates digital information. Powered by the Internet, there are tens of thousands of digital broadcasting platforms each producing and updating its own stream of information. In addition, social media platforms have facilitated a new form of non-vetted, instantaneous information sharing. Social media platforms allow for both public and private posts from anywhere in the world by anybody with a simple user account. The social media platforms therefore generate another type of rapid information stream.

Conventional computer-based analysis of these information streams focuses on sentiment analysis—obtaining information about the opinion of a collective on a topic through textual and/or metadata analysis. Another conventional technology focuses on identifying properties of a group—finding, for example, social media accounts that are not human or automatically identifying harassing messages. However, the conventional technology does not provide the functionality of detecting/predicting events and identifying synthetic driven conversations based upon publicly available information steps.

SUMMARY

What is therefore desired are systems and methods to identify indicators of impending events and synthetic driven conversation based upon electronic media messages originating from both digital broadcasting platforms and social media platforms. A machine-learning based electronic media analysis software system described herein may detect anomalous and predictive patterns associated with an event. The system may use feature extraction techniques and semi-supervised machine-learning to detect the patterns in the electronic media messages associated with the event, which may indicate a synthetic driven conversation corresponding to the event.

In one embodiment, a server-implemented method comprises executing, by a server, a machine-learning model to identify a plurality of keywords from data feeds generated by corresponding plug-ins associated with electronic media data sources, wherein the data feeds comprise electronic media messages, and wherein the plurality of keywords comprises semantic and non-semantic keywords within the electronic media messages; retrieving, by the server, metadata associated with the plurality of keywords from the data feeds; determining, by the server, an in-network memetic relationship between a first subset of the electronic media messages and a cross-network memetic relationship between a second subset of the electronic media messages based upon the plurality of keywords and the metadata associated with the plurality of keywords; and identifying, by the server, a chain of media messages forming a synthetic driven conversation in the data feeds based upon the in-network memetic relationship between the first subset of electronic media messages and the cross-network memetic relationship between the second subset of electronic media messages.

In another embodiment, a system comprises a non-transitory storage medium configured to store a plurality of computer program instructions; and a processor electrically coupled to the non-transitory storage medium and configured to execute the plurality of computer program instructions to: execute a machine-learning model to identify a plurality of keywords from data feeds generated by corresponding plug-ins associated with electronic media data sources, wherein the data feeds comprise electronic media messages, and wherein the plurality of keywords comprises semantic and non-semantic keywords within the electronic media messages; retrieve metadata associated with the plurality of keywords from the data feeds; determine an in-network memetic relationship between a first subset of the electronic media messages and a cross-network memetic relationship between a second subset of the electronic media messages based upon the plurality of keywords and the metadata associated with the plurality of keywords; and identify a chain of the electronic media messages forming a synthetic driven conversation in the data feeds based upon the in-network memetic relationship between the first subset of electronic media messages and the cross-network memetic relationship between the second subset of electronic media messages.

BRIEF DESCRIPTION OF THE DRAWINGS

Non-limiting embodiments of present disclosure are described by way of example with reference to accompanying figures, which are schematic and are not intended to be drawn to scale. Unless indicated as representing background art, the figures represent aspects of the present disclosure.

FIG. 2 illustrates a flow diagram of a method for characterizing of electronic media messages, according to an embodiment.

FIG. 3 illustrates network connections associated with a system for characterizing electronic media messages, according to an embodiment.

DETAILED DESCRIPTION

Figure 1:
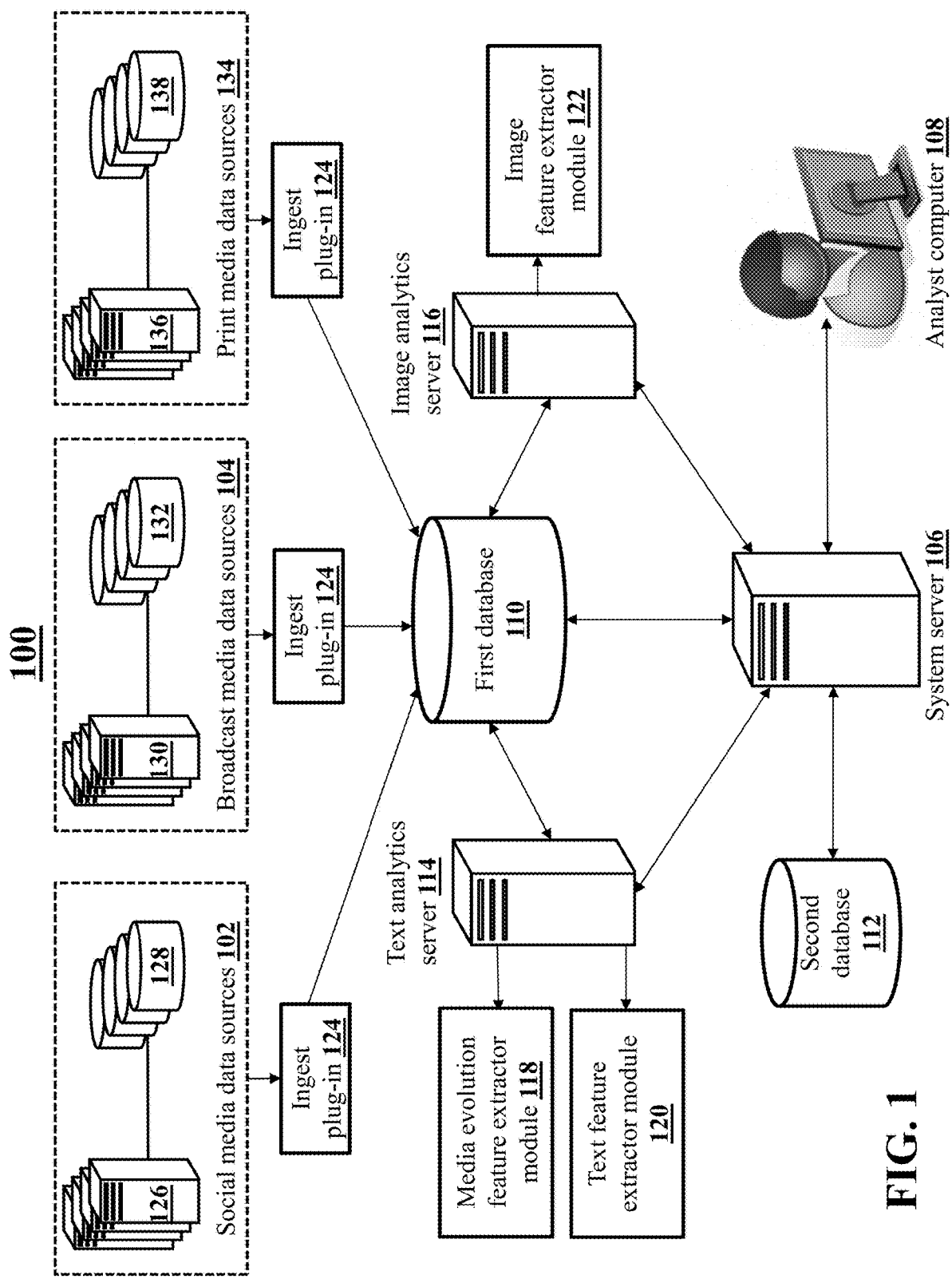
FIG. 1 illustrates an example of a system for characterizing electronic media messages, according to an embodiment.

The present disclosure is here described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here. Reference will now be made to the embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

A system may include an electronic media analysis software algorithm for predicting an event in data feeds across electronic media platforms. The system may apply scalable machine-learning to large-scale electronic media datasets, which may include electronic media messages within the data feeds, to detect anomalous and predictive patterns of the electronic media messages associated with the event. The system may use semi-supervised transductive machine-learning to detect both new anomalies and new instances of a previously-identified warning pattern in the data feeds. The system may use both explicit and implicit electronic media evolution features to capture and analyze how a multi-message story or an electronic media conversation comprising the electronic media messages may develop over time across the electronic media platforms. Based on the analysis, the system may detect anomalous patterns of the electronic media messages associated with the event in the data feeds.

The system may include a machine-learning model, which may be trained to determine useful patterns and signals in the data feeds of the electronic media platforms. The machine-learning model may be a semi-supervised, transductive machine-learning regression model. The machine-learning model may be implemented for planning, monitoring, and pro-actively identifying signs of impending events and patterns in the electronic media messages being shared on the electronic media platforms. The machine-learning model may extract and process the electronic media messages being shared in the electronic media platforms. The machine-learning model may correlate and verify various aspects of the electronic media messages being shared.

The system may be employed by various companies, such as a media agency, a software company, and a professional services company to identify the event on the electronic media platforms in real time as the event is unfolding and help to drive effective action throughout a timeline of the event. The system may provide immediate, actionable intelligence as a predictor of the event on the electronic media platforms or add another layer of intelligence to assess various situations associated with the event.

The system may have several advantages in discovering warnings, indicators, and patterns of the electronic media messages associated with the event in the data feeds. First, the system may use a semi-supervised transductive machine-learning model to both detect novel anomalies and new instances of a previously-identified warning pattern of the electronic media messages in the data feeds since many valuable warning patterns of the electronic media messages are not novel. Second, the system may use algorithms to capture temporal and referential metadata from the data feeds, which may determine how discussion about a topic of the event evolves over time through electronic media network. The metadata may be valuable for detecting driven conversations on the electronic media platforms, particularly in situations such as information operations or astroturfing. Third, the system may determine implicit evolutionary features both within an electronic media source and across electronic media sources through learning applied to features, such as linguistic similarity.

FIG. 1 illustrates components of an illustrative a system 100, according to an embodiment. The system 100 may include various electronic and computing devices, such as electronic media data sources. The electronic media data sources may include social media data sources 102, broadcast media data sources 104, and print media data sources 134. The system 100 may further include a system server 106, an analyst computer 108, a first database 110, a second database 112, a text analytics server 114, an image analytics server 116, a media evolution feature extractor module 118, a text feature extractor module 120, an image feature extractor module 122, and one or more ingest plug-ins 124. The social media data sources 102 may include a plurality of social media data source devices 126 and a plurality of social media databases 128. The broadcast media data sources 104 may include a plurality of broadcast media data source devices 130 and a plurality of broadcast media databases 132. The print media data sources 134 may include a plurality of print media data source devices 136 and a plurality of print media databases 138.

The system 100 is described in a context of computer-executable instructions, such as program modules, being executed by server computers, such as the system server 106. The system server 106 may operate various software programs and algorithms, such as a machine-learning model. The system server 106 may train and execute the machine-learning model. The machine-learning model may include a set of programs, objects, components, data structures, etc., which may perform particular tasks. The features of the system 100 may be practiced either in a single computing device, or in a distributed computing environment, where various tasks may be performed by processing devices, which are linked through a network. In the distributed computing environment, the various program modules may be located in both local and remote computer storage media including memory storage devices.

The social media data sources 102, the broadcast media data sources 104, the system server 106, the analyst computer 108, the first database 110, the second database 112, the text analytics server 114, the image analytics server 116, the print media data sources 134, and various other devices of the system 100 may communicate with each other over the network. The network may include, but is not limited to, a private or public local area network, a wireless local area network, a metropolitan area network, a wide-area network, and Internet. The network may further include both wired and wireless communications according to one or more standards via one or more transport mediums. The communication over the network is in accordance with various communication protocols, such as transmission control protocol, internet protocol, user datagram protocol, and institute of electrical and electronics engineers communication protocols. The network may further include wireless communications according to Bluetooth specification sets, or another standard or proprietary wireless communication protocol. The network may further include communications over a cellular network, including, for example, a global system for mobile communications, code division multiple access, and enhanced data for global evolution network. The network may further include hardware devices (e.g., routers, switches, firewalls) and software components configured to relay data communications between different computing devices and software applications associated with the system.

The system 100 may operate in a local computing environment where the analyst computer 108 may generate various tasks and the system server 106 may execute the tasks using the machine-learning model. A first task may be associated with analyzing data feeds comprising electronic media messages, such as social media messages, broadcast media messages, and print media messages over a predetermined time period. A second task may be associated with generating an electronic report describing an evolution of a synthetic driven conversation over the predetermined time period based on content of the electronic media messages. The first database 110 and application programs associated with the machine-learning model managed by the system server 106 may be stored and executed on local computing resources. The first database 110 may continually receive the data feeds from the social media data sources 102, the broadcast media data sources 104, and the print media data sources 134. The first database 110 may store a summary of the social media messages, the broadcast media messages, and the print media messages within the data feeds. The summary of the social media messages, the broadcast media messages, and the print media messages may be according to an identifier associated with each of the plurality of social media data source devices 126, the plurality of broadcast media data source devices 130, and the plurality of print media data source devices 136. In response to receiving a task request from the analyst computer 108, the system server 106 may locally query the first database 110 to retrieve the data feeds. The system server 106 may process content of the data feeds using the machine-learning model, and generate the electronic report describing the evolution of the synthetic driven conversation. The system server 106 may present the electronic report on an interactive graphical user interface of the analyst computer 108.

The system 100 may operate in a cloud-computing environment where the analyst computer 108 may be cloud-optimized. The analyst computer 108 may generate the tasks, such as the first task and the second task. The system server 106 may execute the tasks using the machine-learning model. The first database 110, the analyst computer 108 data and software programs, and the application programs associated with the machine-learning model may be stored and executed on a remote cloud-based system server 106 accessed over a network cloud. In the cloud-computing environment, a web browser on the analyst computer 108 may interface with a software program corresponding to a task request application. Utilizing the task request application, the analyst computer 108 may generate the task request. The analyst computer 108 may transmit the task request to the remote cloud-based server 106 via the software program. The remote cloud-based server 106 may receive the task request. The remote cloud-based server 106 may query the first database 110 to retrieve the data feeds. The remote cloud-based server 106 may process the content of the data feeds using the machine-learning model, and generate the electronic report describing the evolution of the synthetic driven conversation. The remote cloud-based server 106 may present the electronic report on an interactive graphical user interface of the analyst computer 108.

In operation, the plurality of social media databases 128, the plurality of broadcast media databases 132, and the plurality of print media databases 138 may be loaded continuously with the data feeds in multiple data formats and multiple data types, which may be derived from a plurality of electronic media applications executed and managed by the plurality of social media data source devices 126, the plurality of broadcast media data source devices 130, and the plurality of print media data source devices 136. The plurality of ingest plug-ins 124 associated with the plurality of electronic media data sources may acquire source-specific electronic media messages within the data feeds and transmit the electronic media messages to server computers, such as the text analytics server 114 and the image analytics server 116. The server computers may execute modules, such as the media evolution feature extractor module 118, the text feature extractor module 120, the image feature extractor module 122 to perform normalization, pre-processing, and filtering of the electronic media messages. The normalization, the pre-processing, and the filtering of the electronic media messages may include object recognition, sentiment analysis, and/or entity extraction from each electronic media message.

The server computers may convert the electronic media messages into a collection of variables, which may be suitable as an input to the machine-learning model. The system server 106 may execute the machine-learning model to process and analyze the data feeds. The system server 106 may identify events and patterns associated with driven conversations based upon an in-network memetic relationship and a cross-network memetic relationship between different subsets of electronic media messages within the data feeds, and generate an output. A memetic relationship indicates how ideas are transferred between people. In one instance, when the system server 106 may determine a new predictive pattern in the data feeds, the system server 106 may transmit a notification associated with the new predictive pattern to the analyst computer 108. In another instance, the system server 106 may transmit information associated with structure and properties of an electronic media pattern in the data feeds as the output to the analyst computer 108, which may be useful in subsequent analysis of the electronic media messages within the data feeds.

Social media data sources 102 may generate the data feeds, such as social media data feeds in multiple data formats and multiple data types. The social media data sources 102 may derive the social media data feeds from external sources, such as World Wide Web, social media networks, third-party data providers, and any suitable external source required for proper functioning of the system 100. The social media data feeds may be machine-readable computer files, which may contain social media messages. The social media messages may be in multiple data formats according to various data models of various social media applications. For instance, each social media message may be associated with a prescribed data model, which is further associated with a particular social media application.

The social media data sources 102 may provide the first database 110 with inbound social media data feeds based on a triggering condition (e.g., time-based periodic updates, real-time updates). The social media data sources 102 may directly transmit the inbound social media data feeds directly to the system server 106 over a number of internal and external data networks based on the triggering condition.

The social media data sources 102 may include the plurality of social media data source devices 126. The plurality of social media data source devices 126 may include a first social media data source device managing and executing a first social media data application to generate first social media data feeds. The first social media data feeds may include a collection of first social media messages exchanged by various users across the world on the first social media data application. The plurality of social media data source devices 126 may further include a second social media data source device managing and executing a second social media data application to generate second social media data feeds. The second social media data feeds may include a collection of second social media messages exchanged by various users across the world on the second social media data application. The plurality of social media data source devices 126 may further include a third social media data source device managing and executing a third social media data application to generate third social media data feeds. The third social media data feeds may include a collection of third social media messages exchanged by various users across the world on the third social media data application.

The social media data sources 102 may include the plurality of social media databases 128 associated with the plurality of social media data source devices 126. The plurality of social media databases 128 may include a first social media database associated with the first social media data source device to store the first social media data feeds. The plurality of social media databases 128 may further include a second social media database associated with the second social media data source device to store the second social media data feeds. The plurality of social media databases 128 may further include a third social media database associated with the third social media data source device to store the third social media data feeds.

The plurality of social media data source devices 126 may continuously transmit new social media data feeds to the plurality of social media databases 128 as new social media messages become available. The plurality of social media data source devices 126 may periodically transmit the new social media data feeds to the plurality of social media databases 128. The plurality of social media data source devices 126 may transmit the new social media data feeds to the plurality of social media databases 128 only in response to any update in information within the plurality of social media data source devices 126. The plurality of social media databases 128 may format and store the new social media data feeds received from the plurality of social media data source devices 126.

The plurality of social media data source devices 126 may continuously or periodically directly transmit the social media data feeds stored in the plurality of social media databases 128 to the first database 110. In another embodiment, the plurality of social media data source devices 126 may continuously or periodically transmit the social media data feeds stored in the plurality of social media databases 128 to various tables of the first database 110 via the system server 106. In yet another embodiment, the plurality of social media data source devices 126 may continuously or periodically transmit the social media data feeds to the various tables of the first database 110 via the ingest plug-in 124 associated with social media data applications. The ingest plug-in 124 may be a software component associated with the social media data applications. Each table of the first database 110 may store a unique type of social media data feed. For instance, a first table of the first database 110 may store the first social media data feeds, and similarly, a second table of the first database 110 may store the second social media data feeds. The system server 106 may configure the plurality of social media databases 128 in accordance with one or more rules to periodically (e.g., daily) transmit the social media data feeds to a corresponding table of the first database 110, via a data transfer protocol. The system server 106 may generate the one or more rules, and store the one or more rules in the second database 112. The one or more rules may indicate a time of transfer of the social media data feeds, which may be normalized and pre-processed prior to the transfer.

Broadcast media data sources 104 may generate broadcast media data feeds in multiple data formats and multiple data types. The broadcast media data feeds may be machine-readable computer files, which may contain audio or video content. The audio or video content may be in multiple formats according to multiple data models of multiple broadcast media applications. For instance, each broadcast media content may be associated with a prescribed data model, which is further associated with a particular broadcast media application.

The broadcast media data sources 104 may provide the first database 110 with inbound broadcast media data feeds based on a triggering condition (e.g., time-based periodic updates, real-time updates). The inbound broadcast media data feeds may include a transcription of the audio or video content. The broadcast media data sources 104 may directly transmit the inbound broadcast media data feeds to the system server 106 over a number of internal and external data networks based on the triggering condition.

The broadcast media data sources 104 may include the plurality of broadcast media data source devices 130. The plurality of broadcast media data source devices 130 may include a first broadcast media data source device (for example, a CNN® data-generating server) managing a first broadcast media data application (for example, a CNN® channel and website) to generate first broadcast media data feeds. The first broadcast media data feeds may include a collection of first broadcast media content (for example, videos, articles, etc.) obtained from the first broadcast media data application. The plurality of broadcast media data source devices 130 may further include a second broadcast media data source device (for example, a NBC® data-generating server) managing a second broadcast media data application (for example, a NBC® channel and website) to generate second broadcast media data feeds. The second broadcast media data feeds may include a collection of second broadcast media content (for example, videos, articles, etc.) obtained from the second broadcast media data application. The plurality of broadcast media data source devices 130 may further include a third broadcast media data source device (for example, a FOX® data-generating server) managing a third broadcast media data application (for example, a FOX® channel and website) to generate third broadcast media data feeds. The third broadcast media data feeds may include a collection of third broadcast media content (for example, videos, articles, etc.) obtained from the third broadcast media data application.

The broadcast media data sources 104 may include the plurality of broadcast media databases 132 associated with the plurality of broadcast media data source devices 130. The plurality of broadcast media databases 132 may include a first broadcast media database associated with the first broadcast media data source device to store the first broadcast media data feeds. The plurality of broadcast media databases 132 may further include a second broadcast media database associated with the second broadcast media data source device to store the second broadcast media data feeds. The plurality of broadcast media databases 132 may further include a third broadcast media database associated with the third broadcast media data source device to store the third broadcast media data feeds.

The plurality of broadcast media data source devices 130 may continuously transmit new broadcast media data feeds to the plurality of broadcast media databases 132 as new broadcast media content become available. The plurality of broadcast media data source devices 130 may periodically transmit the new broadcast media data feeds to the plurality of broadcast media databases 132. The plurality of broadcast media data source devices 130 may transmit the new broadcast media data feeds to the plurality of broadcast media databases 132 only in response to any update in information within the plurality of broadcast media data source devices 130. The plurality of broadcast media databases 132 may format content, transcribe content, and store the new broadcast media data feeds received from the plurality of broadcast media data source devices 130.

The plurality of broadcast media data source devices 130 may continuously or periodically directly transmit transcription of content of the broadcast media data feeds stored in the plurality of broadcast media databases 132 to the first database 110. In another embodiment, the plurality of broadcast media data source devices 130 may continuously or periodically transmit the transcription of the content of the broadcast media data feeds stored in the plurality of broadcast media databases 132 to various tables of the first database 110 via the system server 106. In yet another embodiment, the plurality of broadcast media data source devices 130 may continuously or periodically transmit the broadcast media data feeds to the various tables of the first database 110 via the ingest plug-in 124 associated with broadcast media channels. The ingest plug-in 124 may be the software component associated with the broadcast media channels. Each table of the first database 110 may store a unique type of broadcast media data feed. For instance, a third table of the first database 110 may store the transcription of content of the first broadcast media data feeds, and similarly, a fourth table of the first database 110 may store the transcription of content of the second broadcast media feeds. The system server 106 may configure the plurality of broadcast media databases 132 in accordance with the one or more rules to periodically (e.g., weekly) transmit the transcription of the content of the broadcast media data feeds to a corresponding table of the first database 110, via the data transfer protocol. The system server 106 may generate the one or more rules, and store the one or more rules in the second database 112. The one or more rules may indicate the time of transfer of the transcription of the content of the broadcast media data feeds, which may be normalized and pre-processed prior to the transfer.

Print media data sources 134 may generate print media data feeds in multiple data formats and multiple data types. The print media data sources 134 may derive the print media data feeds from external sources, such as World Wide Web, print media forums on social media networks, third-party data providers, and any suitable external source required for the proper functioning of the system 100. The print media data feeds may be machine-readable computer files, which may include print media messages and posts. The print media posts may be in multiple data formats according to various data models of various print media applications (e.g., New York Times®, Washington Post®, Wall Street Journal®). For instance, each print media message may be associated with a prescribed data model, which is further associated with a particular print media application.

The print media data sources 134 may provide the first database 110 with inbound print media data feeds based on a triggering condition (e.g., time-based periodic updates, real-time updates). The print media data sources 134 may directly transmit the inbound print media data feeds to the system server 106 over a number of internal and external data networks based on the triggering condition.

The print media data sources 134 may include the plurality of print media data source devices 136. The plurality of print media data source devices 136 may include a first print media data source device (for example, a New York Times® data-generating server) managing and executing a first print media data application (for example, a New York Times® website) to generate first print media data feeds. The first print media data feeds may include a collection of first print media articles (for example, New York Times® digital reports) obtained from the first print media data application. The plurality of print media data source devices 136 may further include a second print media data source device (for example, a Washington Post® data-generating server) managing and executing a second print media data application (for example, a Washington Post® website) to generate second print media data feeds. The second print media data feeds may include a collection of second print media articles (for example, Washington Post® digital reports) obtained from the second print media data application. The plurality of print media data source devices 136 may further include a third print media data source device (for example, a Wall Street Journal® data-generating server) managing and executing a third print media data application (for example, a Wall Street Journal® website) to generate third print media data feeds. The third print media data feeds may include a collection of third print media messages (for example, Wall Street Journal® digital articles) obtained from the third print media data application.

The print media data sources 134 may include the plurality of print media databases 138 associated with the plurality of print media data source devices 136. The plurality of print media databases 138 may include a first print media database associated with the first print media data source device to store the first print media data feeds. The plurality of print media databases 138 may further include a second print media database associated with the second print media data source device to store the second print media data feeds. The plurality of print media databases 138 may further include a third print media database associated with the third print media data source device to store the third print media data feeds.

The plurality of print media data source devices 136 may continuously transmit new print media data feeds to the plurality of print media databases 138 as new print media articles become available. The plurality of print media data source devices 136 may periodically transmit the new print media data feeds to the plurality of print media databases 138. The plurality of print media data source devices 136 may transmit the new print media data feeds to the plurality of print media databases 138 only in response to any update in information within the plurality of print media data source devices 136. The plurality of print media databases 138 may format and store the new print media data feeds received from the plurality of print media data source devices 136.

The plurality of print media data source devices 136 may continuously or periodically directly transmit the print media data feeds stored in the plurality of print media databases 138 to the first database 110. In another embodiment, the plurality of print media data source devices 136 may continuously or periodically transmit the print media data feeds stored in the plurality of print media databases 138 to various tables of the first database 110 via the system server 106. In yet another embodiment, the plurality of print media data source devices 136 may continuously or periodically transmit the print media data feeds to the various tables of the first database 110 via the ingest plug-in 124 associated with print media websites. The ingest plug-in 124 may be the software component associated with the print media websites. Each table of the first database 110 may store a unique type of print media data feed. For instance, a fifth table of the first database 110 may store the first print media data feeds, and similarly, a sixth table of the first database 110 may store the second print media data feeds. The system server 106 may configure the plurality of print media databases 138 in accordance with the one or more rules to periodically (e.g., hourly) transmit the print media data feeds to a corresponding table of the first database 110, via the data transfer protocol. The system server 106 may generate the one or more rules, and store the one or more rules in the second database 112. The one or more rules may indicate the time of transfer of the print media data feeds, which may be normalized and pre-processed prior to the transfer.

A text analytics server 114 is a computing device. The text analytics server 114 may include a processing unit and a non-transitory machine-readable storage medium. The processing unit may include a processor with a computer-readable medium, such as a random access memory coupled to the processor. The text analytics server 114 may be executing algorithms or computer executable program instructions, which may be executed by a single processor or multiple processors in a distributed configuration. The text analytics server 114 may be configured to interact with one or more software modules of a same or a different type operating within the system 100.

Non-limiting examples of the processor may include a microprocessor, an application specific integrated circuit, and a field programmable object array, among others. The text analytics server 114 is capable of executing various tasks. Non-limiting examples of the text analytics server 114 may include a desktop computer, a server computer, a laptop computer, a tablet computer, and the like. For ease of explanation, the FIG. 1 shows a single server computing device functioning as the text analytics server 114. However, some embodiments may include a plurality of server computing devices capable of performing various tasks described herein.

The text analytics server 114 may be coupled to the first database 110, the social media data sources 102, the broadcast media data sources 104, the print media data sources 134, and the system server 106. When a web connection is established between various devices of the system 100, the text analytics server 114 may be able to receive the data feeds from the social media data sources 102, the broadcast media data sources 104, and the print media data sources 134. At the same time, the text analytics server 114 may be able to transmit an analysis of the data feeds to the first database 110 and the system server 106.

The text analytics server 114 may directly or indirectly execute one or more modules, such as the media evolution feature extractor module 118 and the text feature extractor module 120. These modules may be directly or indirectly associated with various software applications, such as sentiment analysis programs, parsing programs, and machine-learning models. Upon execution of these modules, the text analytics server 114 may identify a set of keywords from the content of the data feeds, which may be associated with a set of electronic media messages corresponding to a driven conversation. The data feeds may include the electronic media messages, such as social media messages, broadcast media messages, and print media messages. Each electronic media message may include words, etc.

The sentiment analysis programs may include computer programs, which may be used for contextual mining of keywords in the data feeds, which may identify and extract subjective information in the data feeds. The parsing programs may include computer programs, which may be used to determine the keywords from the data feeds based on part of speech analysis of each word in the data feeds. The machine-learning model may be trained using a training dataset, and based on one or more predetermined rules. The training dataset may include measurements taken from a sample of a plurality of electronic media messages stored in the first database 110. The one or more predetermined rules may include a first rule, a second rule, a third rule, a fourth rule, among others. The first rule may include instructions to determine a keyword from the data feeds based on a frequency of usage of the keyword in the data feeds. The frequency of usage of the keyword may be based on both explicit and implicit structure between the electronic media messages where the keyword is used, such as likes, retweets, quotations, and re-reporting. The second rule may include instructions to determine a keyword from the data feeds based on a meaning and context of the keyword in the data feeds. The third rule may include instructions to determine a keyword from the data feeds based on semantics associated with each word in the data feeds. The fourth rule may include instructions to determine domain-specific keywords of interest from the electronic media messages, which may be unique according to their use. This may imply that the electronic media messages may use the domain-specific keywords of interest with a different frequency than a typical electronic media message in standard data feeds.

The text analytics server 114 may determine one or more keywords from the data feeds, in response to execution of one or more of the sentiment analysis programs, the parsing programs, and the machine-learning model. The one or more keywords may be terms capturing indicators of information-campaign tactics in the data feeds. The one or more keywords may be included in one set of electronic media messages that will differentiate this one set of electronic media messages from another set of electronic media messages in the data feeds. The one or more keywords may include both semantic keywords and non-semantic keywords. The semantic keywords may refer to the keywords that may be associated with an increase in the electronic media messages in the data feeds, which may mention a particular location where an event occurred. The non-semantic keywords may refer to word use, which may be stylistically typical of a particular author. Upon determining the one or more keywords from the data feeds, the text analytics server 114 may store a record or a cluster of the one or more keywords in the first database 110.

The text analytics server 114 may directly or indirectly retrieve metadata associated with the one or more keywords from the data feeds. The metadata may include each electronic media message within the data feeds, which may include the one or more keywords. The text analytics server 114 may store the metadata associated with the one or more keywords in the first database 110.

The text analytics server 114 may execute the machine-learning model with the one or more keywords as an input. The text analytics server 114 may determine a structure of relationships around and between the electronic media messages in the metadata, in response to the execution of the machine-learning model. In some embodiments, the text analytics server 114 may transmit the metadata to the system server 106. The system server 106 may execute the machine-learning model with the one or more keywords as the input. The system server 106 may determine the structure of relationships around and between the electronic media messages in the metadata, in response to the execution of the machine-learning model.

An image analytics server 116 is a computing device. The image analytics server 116 may include a processing unit and a non-transitory machine-readable storage medium. The processing unit may include a processor with a computer-readable medium, such as a random access memory coupled to the processor. The image analytics server 116 may be executing algorithms or computer executable program instructions, which may be executed by a single processor or multiple processors in a distributed configuration. The image analytics server 116 may be configured to interact with one or more software modules of a same or a different type operating within the system 100.

Non-limiting examples of the processor may include a microprocessor, an application specific integrated circuit, and a field programmable object array, among others. The image analytics server 116 is capable of executing various tasks. Non-limiting examples of the image analytics server 116 may include a desktop computer, a server computer, a laptop computer, a tablet computer, and the like. For ease of explanation, the FIG. 1 shows a single server computing device functioning as the image analytics server 116. However, some embodiments may include a plurality of server computing devices capable of performing various tasks described herein.

The image analytics server 116 may be coupled to the first database 110, the social media data sources 102, the broadcast media data sources 104, the print media data sources 134, and the system server 106. When a web connection is established between various devices of the system 100, the image analytics server 116 may be able to receive the data feeds from the social media data sources 102, the broadcast media data sources 104, and the print media data sources 134. At the same time, the image analytics server 116 may be able to transmit an analysis of the data feeds to the first database 110 and the system server 106.

The image analytics server 116 may directly or indirectly execute at least one module, such as the image feature extractor module 122. The module may be directly or indirectly associated with various software applications, such as image processing algorithms and machine-learning models. Upon execution of these modules, the image analytics server 116 may identify a set of reference images from the content of the data feeds, which may be associated with a set of electronic media messages corresponding to a driven conversation. The data feeds may include the electronic media messages, such as social media messages, broadcast media messages, and print media messages. Each electronic media message may include images, etc.

The image processing algorithms may include computer programs, which may be used to determine the reference images from the data feeds based on analysis of each image in the data feeds. The machine-learning model may be trained using a training dataset, and based on one or more predetermined rules. The training dataset may include measurements taken from the sample of the plurality of electronic media messages stored in the first database 110. The one or more predetermined rules may include a fifth rule, a sixth rule, among others. The fifth rule may include instructions to determine a reference image from the data feeds based on a frequency of usage of the reference image in the data feeds. The frequency of usage of the reference image may be based on both explicit and implicit structure between the electronic media messages where the reference image is used. The sixth rule may include instructions to determine a reference image from the data feeds based on an evaluation of a region of interest data in each image. The region of interest may include text and other readable information within the image.

The image analytics server 116 may determine the one or more reference images from the data feeds, in response to execution of one or more of the image processing algorithms and the machine-learning model. The one or more reference images may be included in one set of electronic media messages that will differentiate this one set of electronic media messages from another set of electronic media messages in the data feeds. The subject matter within the one or more reference images may be related to each other. Upon determining the one or more reference images from the data feeds, the image analytics server 116 may store a record of the one or more reference images in the first database 110.

The image analytics server 116 may retrieve metadata associated with the one or more reference images from the data feeds. The metadata may include each electronic media message within the data feeds, which may include the one or more reference images. The image analytics server 116 may store the metadata associated with the one or more reference images in the first database 110.

The image analytics server 116 may execute the machine-learning model with the one or more reference images as an input. The image analytics server 116 may determine a structure of relationships around and between the electronic media messages in the metadata. In some embodiments, the image analytics server 116 may transmit metadata to the system server 106. The system server 106 may execute the machine-learning model with the one or more reference images as the input. The system server 106 may determine the structure of relationships around and between the electronic media messages in the metadata, in response to the execution of the machine-learning model.

A system server 106 is a computing device. The system server 106 may include a processing unit and a non-transitory machine-readable storage medium. The processing unit may include a processor with a computer-readable medium, such as a random access memory coupled to the processor. The system server 106 may be executing algorithms or computer executable program instructions, which may be executed by a single processor or multiple processors in a distributed configuration. The system server 106 may be configured to interact with one or more software modules of a same or a different type operating within the system 100.

Non-limiting examples of the processor may include a microprocessor, an application specific integrated circuit, and a field programmable object array, among others. The system server 106 is capable of executing various tasks. Non-limiting examples of the server 106 may include a desktop computer, a server computer, a laptop computer, a tablet computer, and the like. For ease of explanation, the FIG. 1 shows a single server computing device functioning as the system server 106. However, some embodiments may include a plurality of server computing devices capable of performing various tasks described herein.

The system server 106 may be coupled to the text analytics server 114, the image analytics server 116, the first database 110, the second database 112, and the analyst computer 108. When a web connection is established between the various devices of the system 100, the system server 106 may be able to receive information from the text analytics server 114, the image analytics server 116, and the first database 110. At the same time, the system server 106 may be able to transmit an analysis of the information to the second database 112 and the analyst computer 108.

The system server 106 may generate a machine-learning model using logistic regression and gradient boosting tree to detect both new occurrences of previously-identified patterns and events, as well as new never-before-observed patterns and events in the electronic media messages within the data feeds. The machine-learning model may include one or more statistical models, such as, weighted least square regression model, gradient boosting regression model, and gradient boosting classification model. In some embodiments, the machine-learning model may include a neural network. The neural network may include an interconnected group of artificial neurons, which may be represented by sample keywords, sample images, and sample electronic media messages. The machine-learning model may represent a semi-supervised mathematical model, which may include mathematical functions describing a relationship between each neuron within the neural network using weight and bias factors. The machine-learning model may include, but not limited to, a mathematical function describing how the neurons are divided into one or more layers.

The system server 106 may train the machine-learning model using the training dataset and various rules. The training dataset may include a relationship between the sample keywords, the sample images, and the sample electronic media messages. Initially, the system server 106 may normalize the sample keywords, the sample images, and the sample electronic media messages using one or more normalization algorithms. The system server 106 may remove noise from the sample keywords, the sample images, and the sample electronic media messages using one or more pre-processing algorithms. The system server 106 may store normalized and pre-processed records of the sample keywords, the sample images, and the sample electronic media messages in the training dataset, which may be used to train the machine-learning model.

The system server 106 may monitor and record performance of the machine-learning model. The system server 106 may continuously update the rules and the relationship between all sample keywords, all sample images, and all sample electronic media messages in the training dataset based on past performance of the machine-learning model. The past performance of the machine-learning model may include an accuracy percentage of past outputs of the machine-learning model. The past outputs may include information about previously-detected events and patterns in the data feeds.

The system server 106 may continuously update the training dataset by including new sample keywords, new sample images, and new sample electronic media messages in the training dataset. The system server 106 may normalize and pre-process the new sample keywords, the new sample images, and the new sample electronic media messages in an updated training dataset. The system server 106 may continuously re-train the machine-learning model using the updated training dataset. For instance, the machine-learning model may use a back-propagation method to reconfigure the mathematical functions (e.g., weight and bias factors), and revise itself to account for new information in the updated training dataset. The machine-learning model may never be complete, and may be iteratively trained each time the training dataset is updated. The system server 106 may use a variety of methods to train and re-train the machine-learning model, such as, evolutionary algorithm methods, simulated annealing methods, expectation-maximization methods, and non-parametric methods.

The system server 106 may execute the machine-learning model, using the one or more keywords and the metadata associated with the one or more keywords as an input, to identify patterns within the data feeds indicating an anomalous occurrence, such as an event. The identified patterns may correspond to features associated with the electronic media messages within the metadata, which may be indicative of valuable information, including unknown events and future events. The identified patterns may further correspond to the electronic media messages within the metadata, which may include characteristics of manipulation of information associated with the event. The characteristics may correspond to informational anomalies, which may be indicators or warnings.

The system server 106 may determine the patterns within the data feeds associated with any event based on an analysis of a structure of a relationship between the electronic media messages within the metadata with respect to each other. The relationship between the electronic media messages within the metadata may be a memetic relationship between the electronic media messages. The structure of the memetic relationship between the electronic media messages may include information associated with evolution, transmission, and imitation of the electronic media messages in one or more electronic media applications, such as one or more social media applications. The memetic relationship between the electronic media messages may include an in-network memetic relationship between a first subset of the electronic media messages within the metadata. The first subset of the electronic media messages may include the electronic media messages within the metadata associated with a single electronic media application. The memetic relationship between the electronic media messages may further include a cross-network memetic relationship between a second subset of the electronic media messages within the metadata. The second subset of the electronic media messages may include the electronic media messages within the metadata associated with multiple electronic media applications.

The system server 106 may determine the in-network memetic relationship between the first subset of the electronic media messages (for example, Twitter® messages) within the metadata based on an analysis of each electronic media message associated with a single electronic media application (for example, Twitter® application) within the metadata. The system server 106 may analyze subject matter of each electronic media message associated with the single electronic media application within the metadata to determine an in-network evolution of the first subset of the electronic media messages within the metadata. The in-network evolution may specify how a story or a collection of interactions comprising the first subset of the electronic media messages associated with the event may develop ("play out") over a period of time in the single electronic media application. In one non-limiting example, in the Twitter® application, "retweets" of Twitter® messages associated with a first event may usually follow a particular pattern of development over the period of time, which may include an originator user, an intermediate user, an influencer user, an interest group, and general users. When there is any deviation in the "retweets" process of the Twitter® messages associated with a second event from a typical retweet structure, the system server 106 may indicate a driven conversation associated with the second event. The driven conversation may include correct or incorrect information associated with the second event.

The system server 106 may determine the cross-network memetic relationship between the second subset of the electronic media messages (for example, Twitter® messages and Reddit® posts) within the metadata based on an analysis of each electronic media message associated with multiple electronic media applications (for example, Twitter® application and Reddit® application) within the metadata. The system server 106 may analyze each electronic media message associated with the multiple electronic media applications within the metadata to determine a cross-network evolution of the second subset of the electronic media messages. The cross-network evolution may specify how information associated with the second subset of the electronic media messages is transmitted and shared between the multiple electronic media applications. In one non-limiting example, a collection of Twitter® interactions and Twitter® messages on the Twitter® application associated with vegetables may inspire a Reddit® post associated with interesting facts about the vegetables, which may in turn lead to blog posts of cooking recipes associated with the vegetables, which may further lead to a New York Times® article, such as "why millennials are obsessed with the vegetables". The system server 106 may analyze all these messages associated with vegetables to determine the cross-network evolution of these messages associated with vegetables on the multiple electronic media applications.

The system server 106 may analyze a configuration of the in-network memetic relationship between the first subset of the electronic media messages. The system server 106 may further analyze a configuration of the cross-network memetic relationship between the second subset of the electronic media messages. The system server 106 may identify a chain of electronic media messages from the first subset of electronic media messages and the second subset of electronic media messages based on the analysis. The chain of electronic media messages may form a synthetic driven conversation in the data feeds. The synthetic driven conversation may correspond to the event. The system server 106 may analyze the chain of electronic media messages to identify valuable information associated with structure and properties of these electronic media messages. The system server 106 may generate an electronic report comprising information associated with a directed evolution of synthetic conversation based on the chain of electronic media messages over a predetermined time period. The system server 106 may transmit the electronic report to the analyst computer 108. The system server 106 may store the electronic report in the second database 112.

An analyst computer 108 may be a portable or a non-portable electronic device. The analyst computer 108 may include processors, which may be configured to perform one or more operations according to one or more programming instructions. The analyst computer 108 may be capable of communicating with the system server 106 through the network using the wired or wireless communication capabilities. Non-limiting examples of the analyst computer 108 may include a computer (e.g., a mobile phone, a laptop, and a tablet).

The analyst computer 108 may execute a task request application to generate multiple tasks. The tasks may include a first task, which may be associated with analyzing the data feeds comprising the electronic media messages over the predetermined time period. The tasks may further include a second task, which may be associated with generating the electronic report. The analyst computer 108 may transmit the tasks to the system server 106.

The analyst computer 108 may receive an output from the system server 106. The analyst computer 108 may include a communication interface on which the output may be presented. The communication interface may be integral with the analyst computer 108. The output may include the electronic report. The electronic report may include the information associated with the directed evolution of the synthetic conversation based on the chain of electronic media messages over the predetermined time period.

A first database 110 may communicate with the social media data sources 102, the broadcast media data sources 104, the print media data sources 134, the text analytics server 114, the image analytics server 116, the media evolution feature extractor module 118, the text feature extractor module 120, the image feature extractor module 122, and the system server 106. The first database 110 may be capable of storing information in a plain format and an encrypted version. The information may include the data feeds, the training dataset, and records associated with various aspects of software application services offered to the users.

A second database 112 may communicate with the system server 106. The second database 112 may be in communication with a processor of the system server 106 where the processor is capable of executing the various commands of the system 100. The second database 112 may be part of the system server 106. The second database 112 may be a separate component in communication with the system server 106. The second database 112 may be capable of storing information in a plain format and an encrypted version. The second database 112 may store the record of the chain of electronic media messages, which may form the synthetic driven conversation. The second database 112 may further store data records associated with various aspects of software application services offered to the analysts. Non-limiting examples of what may be stored in the second database 112 may include analyst records that may include data fields describing users, e.g., analyst data, such as analyst credentials (e.g., username, passwords, biometrics, encryption certificates), analyst profile, analyst account data, or analyst permissions; document records that may comprise machine-readable computer files (e.g., word processing files), parsed portions of such computer files, or metadata associated with computer files; and application data that may include software instructions or data used by various software algorithms.

FIG. 2 shows a flow diagram of an illustrative method for characterization of electronic media messages, according to an embodiment. The method 200 shown in the FIG. 2 may include execution steps 202, 204, 206, and 208. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a system server in this embodiment. The system server executing one or more steps may be programmed to execute various other, unrelated essential features. The steps may also be executed by a plurality of server computing devices operating in a distributed computing environment.

In a first step 202, the system server may periodically retrieve reference electronic media messages from various electronic media data sources. The electronic media data sources may include social media data sources, broadcast media data sources, and print media data sources. The server may store the reference electronic media messages in a database. The system server may generate a training dataset using measurements taken from a sample of the reference electronic media messages. The system server may train a machine-learning model using the training dataset. After a predetermined period of time, the system server may once more retrieve new reference electronic media messages from the electronic media data sources. The system server may store the new reference electronic media messages in the database. The system server may generate an updated training dataset using measurements taken from a sample of the new reference electronic media messages. The system server may retrain machine-learning model using the updated training dataset.

The system server may receive data feeds in real time via plug-ins associated with multiple electronic media applications of the electronic media data sources. The electronic media applications may include social media applications, broadcast media applications, and print media applications. The data feeds may include electronic media messages. The electronic media messages may include social media messages, broadcast media messages, and print media messages.

The server may execute the machine-learning model to identify a plurality of keywords from the data feeds. The plurality of keywords may include semantic keywords within the data feeds. The semantic keywords may include words or phrases in the electronic media messages that are related to each other conceptually. For example, for a keyword like "search volume" in the electronic media messages, a semantically related keyword in the electronic media messages may be keyword research. The plurality of keywords may further include non-semantic keywords within the data feeds.

In a next step 204, the server may retrieve metadata associated with the plurality of keywords from the data feeds. The metadata may include each electronic media message with the data feeds, which may include any of the plurality of keywords. The metadata may further include each electronic media message with the data feeds, which may include a synonym of any of the plurality of keywords.

In a next step 206, the server may determine an in-network memetic relationship between a first subset of the electronic media messages in the data feeds based upon the plurality of keywords and the metadata associated with the plurality of keywords. The in-network memetic relationship between the first subset of the electronic media messages may specify how information associated with an event is shared within a single electronic media data source using the first subset of the electronic media messages.

The server may further determine a cross-network memetic relationship between a second subset of the electronic media messages in the data feeds based upon the plurality of keywords and the metadata associated with the plurality of keywords. The cross-network memetic relationship between the second subset of the electronic media messages may specify how information associated with the event is shared between multiple electronic media data sources using the second subset of the electronic media messages.

In a next step 208, the server may identify a chain of electronic media messages based upon the in-network memetic relationship between the first subset of electronic media messages and the cross-network memetic relationship between the second subset of electronic media messages. The chain of electronic media messages may form a synthetic driven conversation in the data feeds. The server may generate an electronic report based on the analysis of the chain of media messages. The server may transmit the electronic report to an analyst computer. A graphical user interface of the analyst computer may display the electronic report.

FIG. 3 illustrates network connections associated with a system 300. The system 300 may include various electronic media data sources. The electronic media data sources may include a Facebook® data source 302 operating a Facebook® application, a CNN® data source 304 operating a CNN® channel and website, a Twitter® data source 306 operating a Twitter® application, and a NYT® data source 308 operating a New York Times® website. The system 300 may further include a system server 310. The system server 310 may directly or indirectly receive data feeds in real time from the electronic media data sources. The system server 310 may execute a machine-learning model to process and analyze electronic media messages within the data feeds. The system server 310 may generate an electronic report based on the analysis of the electronic media messages. The electronic report may include information associated with a directed evolution of a conversation about a particular topic in the electronic media messages over a predetermined period of time. The topic may be an event, such as an accident or an election day. The system server 310 may transmit the electronic report to an analyst computer 312. The analyst computer 312 may display the electronic report.

In a non-limiting example, a would-be terrorist may make a failed attack near The Louvre, resulting in his death at the hands of French police. Within some time, on social media applications such as Twitter® and Facebook®, there are many messages about this event mentioning key aspects of the event. Early on, some of the messages may use the terms "unarmed" and "executed". Use of these terms may later spread to other messages on the social media applications. A system server may scan the social media applications. The system server may detect a sudden popularity of The Louvre and related keywords (for instance, unarmed and executed), which may indicate about an occurrence of this event. The system server may analyze a flow of keywords frequency and an evolution of the messages associated with this event, which may indicate that an anomalous word usage (for instance, unarmed) is a result of a driven conversation. The driven conversation may be a disinformation campaign by an organized group of users.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
    executing, by a server, a machine-learning model to identify a plurality of keywords from a plurality of data feeds generated by corresponding plug-ins associated with electronic media data sources, wherein the data feeds comprise electronic media messages, and wherein the plurality of keywords comprises semantic and non-semantic keywords within the electronic media messages;
    retrieving, by the server, metadata associated with the plurality of keywords from the data feeds;
    determining, by the server, an in-network memetic relationship indicating an in-network deviation within a first subset of the electronic media messages of a data feed of the plurality of data feeds, the in-network deviation of the in-network memetic relationship determined according to the electronic media messages of the data feed produced over time;
    determining, by the computer, a cross-network memetic relationship indicating a cross-network deviation within a second subset of the electronic media messages of two or more data feeds of the plurality of data feeds based upon the plurality of keywords and the metadata associated with the plurality of keywords, the cross-network deviation of the cross-network memetic relationship determined according to the electronic media messages of the two or more data feeds produced over time;
    identifying, by the server, a chain of the electronic media messages over time forming a synthetic driven conversation in the plurality of data feeds based upon the in-network deviation of the in-network memetic relationship between the first subset of electronic media messages produced over time from the data feed and the cross-network deviation of the cross-network memetic relationship between the second subset of electronic media messages produced over time from the two or more data feeds; and
    generating, by the server, a predictive pattern for an event according to the synthetic driven conversation, the predictive pattern trained to detect the event corresponding to the synthetic driven conversation in a plurality of future data feeds.

2. The server-implemented method according to claim 1, wherein the electronic media data sources comprises social media data sources, broadcast media data sources, and print media data sources.

3. The server-implemented method according to claim 2, further comprising:
    retrieving, by the server, reference electronic media messages from the electronic media data sources, wherein the reference electronic media messages are stored in a database.

4. The server-implemented method according to claim 3, further comprising:
    training, by the server, the machine-learning model using a training dataset, wherein the training dataset comprises measurements taken from a sample of the reference electronic media messages stored in the database.

5. The server-implemented method according to claim 4, further comprising:
    retrieving, by the server, new reference electronic media messages from the electronic media data sources, wherein the new reference electronic media messages are stored in the database.

6. The server-implemented method according to claim 5, further comprising:
    retraining, by the server, the machine-learning model using an updated training dataset, wherein the updated training dataset comprises measurements taken from a sample of the new reference electronic media messages stored in the database.

7. The server-implemented method according to claim 1, further comprising:
    generating, by the server, an electronic report comprising the chain of the electronic media messages forming the synthetic driven conversation in the data feeds.

8. The server-implemented method according to claim 7, further comprising:
    transmitting, by the server, the electronic report to an analyst computer, wherein a graphical user interface of the analyst computer displays the electronic report.

9. The server-implemented method according to claim 1, wherein the in-network memetic relationship between the first subset of the electronic media messages corresponds to how information is shared on a single electronic media data source using the first subset of the electronic media messages.

10. The server-implemented method according to claim 1, wherein the cross-network memetic relationship between the second subset of the electronic media messages corresponds to how information is shared between multiple electronic media data sources using the second subset of the electronic media messages.

11. A system comprising:
a non-transitory storage medium configured to store a plurality of computer program instructions; and
a processor electrically coupled to the non-transitory storage medium and configured to execute the plurality of computer program instructions to:
execute a machine-learning model to identify a plurality of keywords from a plurality of data feeds generated by corresponding plug-ins associated with electronic media data sources, wherein the data feeds comprise electronic media messages, and wherein the plurality of keywords comprises semantic and non-semantic keywords within the electronic media messages;
retrieve metadata associated with the plurality of keywords from the data feeds;
determine an in-network memetic relationship indicating an in-network deviation within a first subset of the electronic media messages of a data feed of the plurality of data feeds, the in-network deviation of the in-network memetic relationship determined according to the electronic media messages of the data feed produced over time;
determine a cross-network memetic relationship indicating a cross-network deviation within a second subset of the electronic media messages of two or more data feeds of the plurality of data feeds based upon the plurality of keywords and the metadata associated with the plurality of keywords, the cross-network deviation of the cross-network memetic relationship determined according to the electronic media messages of the two or more data feeds produced over time;
identify a chain of the electronic media messages over time forming a synthetic driven conversation in the plurality of data feeds based upon the in-network deviation of the in-network memetic relationship between the first subset of electronic media messages produced over time from the data feed and the cross-network deviation of the cross-network memetic relationship between the second subset of electronic media messages produced over time from the two or more data feeds; and
generate a predictive pattern for an event according to the synthetic driven conversation, the predictive pattern trained to detect the event corresponding to the synthetic driven conversation in a plurality of future data feeds.

12. The system according to claim 11, wherein the electronic media data sources comprises social media data sources, broadcast media data sources, and print media data sources.

13. The system according to claim 12, wherein the processor is configured to further execute the plurality of computer program instructions to:
retrieve reference electronic media messages from the electronic media data sources, and wherein the reference electronic media messages are stored in a database.

14. The system according to claim 13, wherein the processor is configured to further execute the plurality of computer program instructions to:
train the machine-learning model using a training dataset, wherein the training dataset comprises measurements taken from a sample of the reference electronic media messages stored in the database.

15. The system according to claim 14, wherein the processor is configured to further execute the plurality of computer program instructions to:
retrieve new reference electronic media messages from the electronic media data sources, and wherein the new reference electronic media messages are stored in the database.

16. The system according to claim 15, wherein the processor is configured to further execute the plurality of computer program instructions to:
retrain the machine-learning model using an updated training dataset, wherein the updated training dataset comprises measurements taken from a sample of the new reference electronic media messages stored in the database.

17. The system according to claim 11, wherein the processor is configured to further execute the plurality of computer program instructions to:
generate an electronic report comprising the chain of the electronic media messages forming the synthetic driven conversation in the data feeds.

18. The system according to claim 17, wherein the processor is configured to further execute the plurality of computer program instructions to:
transmit the electronic report to an analyst computer, wherein a graphical user interface of the analyst computer displays the electronic report.

19. The system according to claim 11, wherein the in-network memetic relationship between the first subset of the electronic media messages corresponds to how information is shared on a single electronic media data source using the first subset of the electronic media messages.

20. The system according to claim 11, wherein the cross-network memetic relationship between the second subset of the electronic media messages corresponds to how information is shared between multiple electronic media data sources using the second subset of the electronic media messages.

* * * * *